US011783034B2

(12) United States Patent
Kim et al.

(10) Patent No.: US 11,783,034 B2
(45) Date of Patent: Oct. 10, 2023

(54) APPARATUS AND METHOD FOR DETECTING MALICIOUS SCRIPT

(71) Applicant: ELECTRONICS AND TELECOMMUNICATIONS RESEARCH INSTITUTE, Daejeon (KR)

(72) Inventors: Jung-Tae Kim, Daejeon (KR); Ji-Hyeon Song, Daejeon (KR); Ik-Kyun Kim, Daejeon (KR); Young-Su Kim, Daejeon (KR); Jong-Hyun Kim, Daejeon (KR); Jong-Geun Park, Sejong (KR); Sang-Min Lee, Daejeon (KR); Jong-Hoon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 496 days.

(21) Appl. No.: 17/100,541

(22) Filed: Nov. 20, 2020

(65) Prior Publication Data

US 2021/0240827 A1 Aug. 5, 2021

(30) Foreign Application Priority Data

Feb. 5, 2020 (KR) .................. 10-2020-0013795

(51) Int. Cl.
*G06F 21/56* (2013.01)
*G06N 5/04* (2023.01)
*G06N 20/00* (2019.01)

(52) U.S. Cl.
CPC ............. *G06F 21/563* (2013.01); *G06N 5/04* (2013.01); *G06N 20/00* (2019.01); *G06F 2221/033* (2013.01)

(58) Field of Classification Search
CPC ..................................................... G06F 21/563
See application file for complete search history.

(56) References Cited

U.S. PATENT DOCUMENTS 8,838,992 B1 9/2014 Zhu et al.
10,089,460 B2 10/2018 Moon et al.
(Continued)

FOREIGN PATENT DOCUMENTS

KR 101858620 B1 5/2018

OTHER PUBLICATIONS

Seung-Hyeon Lee et al., "PowerShell-based Malware Detection Method Using Command Execution Monitoring and Deep Learning", Journal of the Korea Institute of Information Security & Cryptology, Oct. 2018, pp. 1197-1207, vol. 28, No. 5.

*Primary Examiner* — Simon P Kanaan

(57) ABSTRACT

Disclosed herein are an apparatus and method for detecting a malicious script. The apparatus includes one or more processors and executable memory for storing at least one program executed by the one or more processors. The at least one program is configured to extract token-type features, each of which corresponds to a lexical unit, and tree-node-type features of an abstract syntax tree from an input script, to train two learning models to respectively learn two pieces of learning data that are generated in consideration of features extracted respectively from the token-type features and the node-type features as having the highest frequency, and to detect whether the script is a malicious script based on the result of ensemble-based malicious script detection performed for the script, which is acquired using an ensemble detection model generated from the two learning models.

12 Claims, 10 Drawing Sheets

(56) References Cited

U.S. PATENT DOCUMENTS

| | | | | |
|---|---|---|---|---|
| 10,922,604 B2* | 2/2021 | Zhao | .................. | G06F 21/563 |
| 11,074,494 B2* | 7/2021 | Zhao | .................. | G06N 3/044 |
| 2012/0158626 A1* | 6/2012 | Zhu | .................. | G06F 21/56 |
| | | | | 726/22 |
| 2014/0201939 A1* | 7/2014 | Pruitt | .................. | E06B 7/16 |
| | | | | 15/301 |
| 2015/0379072 A1* | 12/2015 | Dirac | .................. | G06N 20/00 |
| | | | | 707/693 |
| 2015/0379430 A1* | 12/2015 | Dirac | .................. | G06N 20/00 |
| | | | | 706/12 |
| 2016/0226894 A1 | 8/2016 | Lee et al. | | |
| 2017/0249455 A1 | 8/2017 | Permeh et al. | | |

* cited by examiner

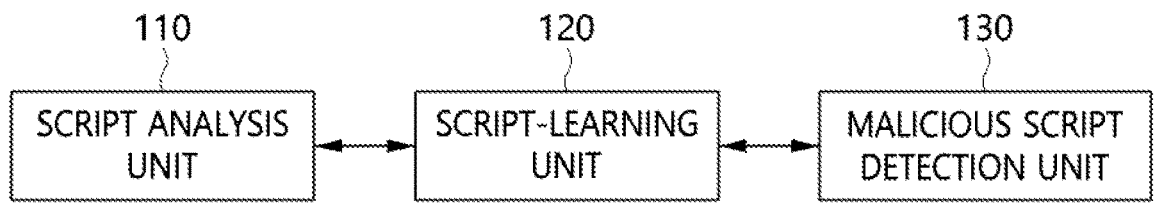

FIG. 1

```
normal1, 1, 0, import-csv
normal2, 19, 0, get-azureupdates, get-automationpscredential, -name, inlinescript, irm, get-date, get-date, new-object,
-typename, measure, measure, send-mailmessage, -to,-from, -subject, -body, -smtpserver, -credential, -usessl normal3,5, 0, get-content, -path, out-file, -encoding, utf8 normal4, 19, 0, add-windowsfeature, web-server, add-content, -path, -value, new-item, -itemtype, directory, -path,
new-item, -itemtype, directory, -path, add-content, -path, -value, add-content, -path, -value
```

FIG. 2 normal1, 12, 0, ScriptBlockAst, NamedBlockAst, AssignmentStatementAst, VariableExpressionAst, CommandExpressionAst, StringConstantExpressionAst, AssignmentStatementAst, VariableExpressionAst, Pipeline Ast, CommandAst, StringConstantExpressionAst, VariableExpressionAst normal2, 2, 0, ScriptBlockAst, NamedBlockAst normal3, 35, 0, ScriptBlockAst, NamedBlockAst, Pipeline Ast, CommandAst, StringConstantExpressionAst, StringConstantExpressionAst, StringConstantExpressionAst, StringConstantExpressionAst, StringConstantExpressionAst, MemberExpressionAst, VariableExpressionAst, StringConstantExpressionAst, StringConstantExpressionAst,

FIG. 3

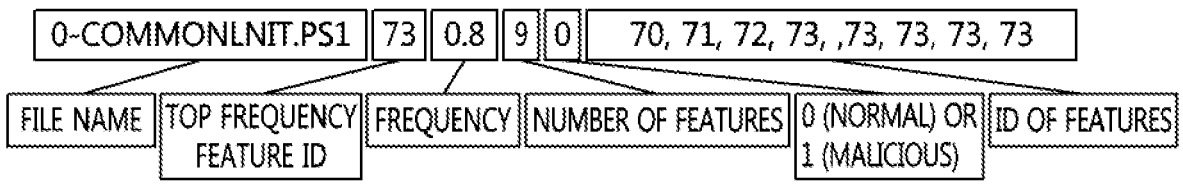

FIG. 4

| Token (Normal) | Frequency |
|---|---|
| Mandatory | 6902 |
| name | 5050 |
| AddressList | 4150 |
| MACAddresses | 2823 |
| filter | 2657 |
| value | 2239 |
| EXPRESSION | 1974 |
| PathLength | 1607 |
| ValueFromPipeline | 1567 |
| SchemaMaster | 1523 |

FIG. 7

| Token (Malicious) | Frequency |
|---|---|
| length | 7093 |
| definefield | 4538 |
| mandatory | 3516 |
| position | 3140 |
| invoke | 3123 |
| zero | 2618 |
| setoffset | 2517 |
| add | 1936 |
| virtualalloc | 1638 |
| frombase64string | 1595 |

FIG. 8

| | NORMAL1 | NORMAL2 | NORMAL3 | MAL1 | MAL2 | MAL3 |
|---|---|---|---|---|---|---|
| NORMAL1 | 1 | 0.15147154 | 0.24703011 | 0 | 0 | 0 |
| NORMAL2 | 0.15147154 | 1 | 0.35356722 | 0 | 0 | 0 |
| NORMAL3 | 0.24703011 | 0.35356722 | 1 | 0 | 0 | 0 |
| MAL1 | 0 | 0 | 0 | 1 | 0.23253722 | 0.15498325 |
| MAL2 | 0 | 0 | 0 | 0.23253722 | 1 | 0.71386076 |
| MAL3 | 0 | 0 | 0 | 0.15498325 | 0.71386076 | 1 |

FIG. 9

APPARATUS AND METHOD FOR DETECTING MALICIOUS SCRIPT

CROSS REFERENCE TO RELATED APPLICATION

This application claims the benefit of Korean Patent Application No. 10-2020-0013795, filed Feb. 5, 2020, which is hereby incorporated by reference in its entirety into this application.

BACKGROUND OF THE INVENTION

1. Technical Field

The present invention relates generally to technology for detecting a malicious script, and more particularly to technology for extracting a script, calculating similarity between scripts, performing deep-learning on scripts, and classifying and detecting malicious scripts.

2. Description of the Related Art

These days, file-less malicious code using a script executed in memory continues to emerge. Such malicious code takes a file-less form so as to be executed without a malicious executable file in a file system. Accordingly, it is difficult for users to detect such file-less malicious code, which poses a great threat. Particularly, when file-less malicious code is run using PowerShell for an attack, because the file-less malicious code is capable of accessing main functions of an operating system, certificates, or the like while leaving hardly any trace of execution thereof, not only users but also analysts have trouble detecting and analyzing the attack. Also, when a script itself is a benign script but is exploited for performing malicious behavior, it is difficult to determine whether the script is benign or malicious, and an existing signature-based detection method is not capable of detecting such malicious scripts.

Meanwhile, Korean Patent Application Publication No. 10-2017-0003348, titled "Device and method for analyzing JavaScript using machine learning", discloses a device and method for analyzing JavaScript using machine learning, through which a webpage including a malicious script is capable of being detected by analyzing the call sequence of JavaScript functions.

SUMMARY OF THE INVENTION

An object of the present invention is to more accurately detect a malicious script to thereby provide a more accurate detection result.

Another object of the present invention is to enable the result of detection of a new variant of a malicious script to be predicted rapidly.

A further object of the present invention is to provide not only a detection result but also the result of detailed classification of scripts according to the types thereof.

In order to accomplish the above objects, an apparatus for detecting a malicious script according to an embodiment of the present invention includes one or more processors and executable memory for storing at least one program executed by the one or more processors. The at least one program may extract token-type features, each of which corresponds to a lexical unit, and tree-node-type features of an abstract syntax tree from an input script, train two learning models to respectively learn two pieces of learning data generated in consideration of features extracted respectively from the token-type features and the tree-node-type features as having the highest frequency, and detect whether the script is a malicious script based on the result of ensemble-based malicious script detection performed for the script, which is acquired using an ensemble detection model generated from the two learning models.

Here, the token-type features may include at least one of a command type for a command included in the script, a parameter type used along with the command, an argument type used along with the command, a keyword type included in the script, and a variable type included in the script.

Here, the tree-node-type features may correspond to an N-GRAM sequence extracted from the abstract syntax tree using an N-GRAM algorithm.

Here, the at least one program may set two weights based on the similarity acquired by comparing the script with each of a previously stored normal script and a previously stored malicious script with respect to the token-type features and the tree-node-type features.

Here, the at least one program may group the features extracted as having the highest frequency according to types of functions performed by the features extracted as having the highest frequency in the normal script and the malicious script.

Here, the at least one program may set the two weighs based on the features extracted as having the highest frequency and generate the ensemble detection model by applying the two weights to the two learning models, respectively.

Also, in order to accomplish the above objects, a method for detecting a malicious script, performed by a malicious script detection apparatus, according to an embodiment of the present invention includes extracting token-type features, each of which corresponds to a lexical unit, and tree-node-type features of an abstract syntax tree from an input script, training two learning models to respectively learn two pieces of learning data generated in consideration of features extracted respectively from the token-type features and the tree-node-type features as having the highest frequency, and detecting whether the script is a malicious script based on the result of ensemble-based malicious script detection performed for the script, which is acquired using an ensemble detection model generated from the two learning models.

Here, the token-type features may include at least one of a command type for a command included in the script, a parameter type used along with the command, an argument type used along with the command, a keyword type included in the script, and a variable type included in the script.

Here, the tree-node-type features may correspond to an N-GRAM sequence extracted from the abstract syntax tree using an N-GRAM algorithm.

Here, training the two learning models may be configured to set two weights based on the similarity acquired by comparing the script with each of a previously stored normal script and a previously stored malicious script with respect to the token-type features and the tree-node-type features.

Here, detecting whether the script is a malicious script may be configured to group the features extracted as having the highest frequency according to types of functions performed by the features extracted as having the highest frequency in the normal script and the malicious script.

Here, detecting whether the script is a malicious script may be configured to set the two weighs based on the features extracted as having the highest frequency and to generate the ensemble detection model by applying the two weights to the two learning models, respectively.

BRIEF DESCRIPTION OF THE DRAWINGS

The above and other objects, features and advantages of the present invention will be more clearly understood from the following detailed description, taken in conjunction with the accompanying drawings, in which:

FIG. 1 is a block diagram illustrating an apparatus for detecting a malicious script according to an embodiment of the present invention;

FIG. 2 is a view illustrating the types of tokens extracted from a script according to an embodiment of the present invention;

FIG. 3 is a view illustrating the types of nodes of an abstract syntax tree extracted from a script according to an embodiment of the present invention;

FIG. 4 is a view illustrating the structure of learning data according to an embodiment of the present invention;

FIG. 7 is a table illustrating the frequencies of occurrence of token-type features in a normal script according to an embodiment of the present invention;

FIG. 8 is a table illustrating the frequencies of occurrence of token-type features in a malicious script according to an embodiment of the present invention;

FIG. 9 is a table illustrating the result of measurement of the similarity between scripts according to an embodiment of the present invention;

DESCRIPTION OF THE PREFERRED EMBODIMENTS

Figure 5:
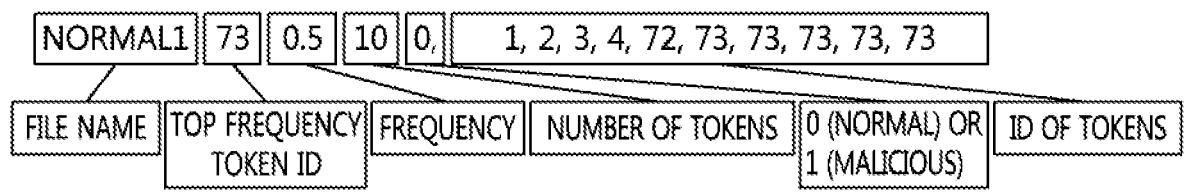
FIG. 5 is a view illustrating the structure of learning data generated from token-type features according to an embodiment of the present invention.

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

Figure 6:
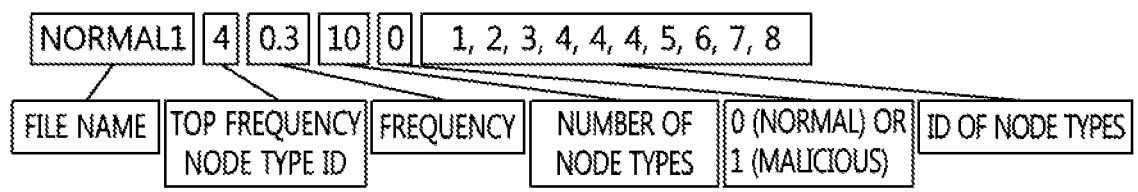
FIG. 6 is a view illustrating the structure of learning data generated from tree-node-type features according to an embodiment of the present invention.

FIG. 1 is a block diagram illustrating an apparatus for detecting a malicious script according to an embodiment of the present invention. FIG. 2 is a view illustrating the types of tokens extracted from a script according to an embodiment of the present invention. FIG. 3 is a view illustrating the types of nodes of an abstract syntax tree extracted from a script according to an embodiment of the present invention. FIG. 4 is a view illustrating the structure of learning data according to an embodiment of the present invention. FIG. 5 is a view illustrating the structure of learning data generated from token-type features according to an embodiment of the present invention. FIG. 6 is a view illustrating the structure of learning data generated from tree-node-type features according to an embodiment of the present invention. FIG. 7 is a table illustrating the frequencies of occurrence of token-type features in a normal script according to an embodiment of the present invention. FIG. 8 is a table illustrating the frequencies of occurrence of token-type features in a malicious script according to an embodiment of the present invention. FIG. 9 is a table illustrating the result of measurement of similarity between scripts according to an embodiment of the present invention.

Referring to FIG. 1, the apparatus for detecting a malicious script according to an embodiment of the present invention includes a script analysis unit 110, a script-learning unit 120, and a malicious script detection unit 130.

The script analysis unit 110 may extract token-type features, each of which corresponds to a lexical unit, and tree-node-type features of an abstract syntax tree (AST) from an input script.

Here, the script analysis unit 110 may check whether the script is obfuscated before analyzing the script.

Here, when the script is obfuscated, the script analysis unit 110 may eliminate the obfuscation, and may perform static analysis of the script.

Here, the script analysis unit 110 may extract the features of the script.

Here, the script analysis unit 110 may segment the script into lexical units (tokens) using a tokenization method.

Here, all of the words included in the script may be regarded as tokens.

Here, the script analysis unit 110 may extract a token-type feature that frequently occurs in the script and that contributes to distinguishing between a malicious script and a normal script.

Referring to FIG. 2, tokens extracted from a script are illustrated.

Here, the token-type features may include at least one of a command type for representing a command included in the script, a parameter type used along with the command, an argument type used along with the command, a keyword type included in the script, and a variable type included in the script.

The command type is a type representing commands constituting the entire script, and may be used along with parameters and arguments.

The command parameter type may represent parameters used along with commands.

The command argument type may represent arguments used along with commands.

The keyword type may represent all keywords, and conditional statements may correspond thereto.

Here, when a token of a variable type appears after a token of a keyword type, a branch statement or the like may be additionally taken into consideration.

The variable type may represent all variables. Including all of the variables in the script may increase the cost of extraction and analysis of features, but may enable the flow of the script to be detected when the variable type is used along with the keyword type.

Here, the script analysis unit 110 may sequentially arrange the tokens (words) appearing in the script and use the same for training a first learning model.

Here, the scrip analysis unit 110 may convert all of the tokens to lower case, remove duplicate tokens therefrom, assign a number starting from 1 (hereinbelow referred to as ID_1) thereto, and save the tokens in a text file.

Also, the script analysis unit 110 may extract the frequencies of the token-type features included in the script.

Here, the script analysis unit 110 may store the frequencies of the token-type features in a database.

Also, the script analysis unit 110 may generate an abstract syntax tree (AST) from the script to be analyzed, and may extract tree node types therefrom.

The abstract syntax tree may represent a script in units of blocks, and the node types of the AST may be used as features.

Here, the script analysis unit 110 may convert all of the extracted tree node types to lower case, remove duplicate tree node types therefrom, assign a number (ID_2) thereto, and save the same in a text file.

Here, the tree-node-type features may correspond to an N-GRAM sequence extracted from the abstract syntax tree using an N-GRAM algorithm.

Because the abstract syntax tree represents the script in units of blocks, the overall structure of the script may be detected when the sequence information is used therewith.

Accordingly, the script analysis unit 110 extracts an N-GRAM sequence by applying an N-GRAM algorithm to a document (document 1) in which tree node types appearing in each script are arranged, thereby generating a document (document 2) in which the N-GRAM sequence is listed.

Referring to FIG. 3, node types extracted from the abstract syntax tree of a script are illustrated.

Also, the script analysis unit 110 may extract the frequencies of the tree-node-type features.

Here, the script analysis unit 110 may store the frequencies of the tree-node-type features in the database.

Here, the script analysis unit 110 may store the IDs of the token and tree node type that most frequently occur in the script along with the frequencies thereof.

Here, the script analysis unit 110 may extract the m most frequently occurring tokens, the m most frequently occurring tree node types, and the frequencies thereof from the script and use the same as features for training learning models.

Here, the script analysis unit 110 may continuously increase the m most frequently occurring tokens and the m most frequently occurring tree node types to a preset number of tokens and tree node types and use the same.

Here, when the frequency value is greater than a preset value, the script analysis unit 110 may adjust the frequency value by applying a logarithm thereto.

Here, the script analysis unit 110 may extract the features corresponding to five token types from a script, generate an AST from the script, extract tree node types from the AST, and store the extracted features and tree node types in the database.

Here, the script analysis unit 110 may store the IDs of the m most frequently occurring tokens and m most frequently occurring tree node types, the frequencies of the m tokens and m tree node types, and the documents in which the IDs of all of the tokens and node types extracted from the script are arranged in the database.

Also, the script analysis unit 110 additionally stores the m extracted tokens, the m extracted node types, and frequency information pertaining thereto in the database. Accordingly, when a new variant of a script is detected and classified, the detection and classification result may be inferred in advance merely by extracting tokens and node types from the script and checking the most frequently occurring features and the frequencies thereof before the detection result acquired by training a learning model is checked.

Here, the script analysis unit 110 measures the frequencies of tokens and node types extracted respectively from a normal script and a malicious script and compares the same, thereby detecting tokens and node types more frequently occurring in the malicious script.

The script-learning unit 120 may train two learning models on two pieces of learning data that are generated in consideration of the features extracted respectively from the token-type features and the node-type features as having the highest frequency.

Here, the script-learning unit 120 may generate learning data for training a first learning model and a second learning model using the extracted features.

Here, the script-learning unit 120 may learn the document (text file) in which all of the extracted token types and tree node types are saved along with the IDs (ID_1 and ID_2) thereof after being converted to lower case and deduplicated.

Here, the script-learning unit 120 may replace the order of appearance of a certain token type or tree node type in the script with the ID saved in the text file and arrange the same.

Here, the script-learning unit 120 may train the first learning model and the second learning model to learn the IDs of the m most frequently occurring tokens and the m most frequently occurring tree node types, the frequencies of the m tokens and m tree node types, and the document in which the IDs of all of the tokens and node types extracted from the script are listed.

Here, the script-learning unit 120 may generate learning data using the IDs of the m most frequently occurring tokens and the m most frequently occurring node types and the frequencies of the m node types.

Here, the script-learning unit 120 may generate 'ID_1 of the m most frequently occurring tokens, the frequencies thereof, and ID_1 of all of the tokens appearing in the script' as learning data for training the first learning model.

Here, the script-learning unit 120 may generate 'ID_2 of the m most frequently occurring node types, the frequencies thereof, and ID_2 of all of the node types appearing in the script' as learning data for training the second learning model.

Referring to FIG. 4, the structure of learning data according to an embodiment of the present invention is illustrated.

Learning data according to an embodiment of the present invention may include a file name, the ID of the feature having the highest frequency (top frequency feature ID), the highest frequency (frequency), the number of features, a value indicating a normal or malicious script (0 or 1), and the IDs of features.

When the number of the most frequently occurring tokens and node types is set to 1 (m=1), the ID of the single most frequently occurring token, the ID of the single most frequently occurring node type, and the frequencies thereof are included in learning data, and m may be freely changed.

Referring to FIG. 5, the structure of learning data generated from token-type features according to an embodiment of the present invention is illustrated.

Referring to FIG. 6, the structure of learning data generated from tree-node-type features according to an embodiment of the present invention is illustrated.

Here, the script-learning unit 120 may set two weights based on the similarity acquired by comparing the script with each of a previously stored normal script and a previously stored malicious script with respect to the token-type features and the tree-node-type features.

Here, the script-learning unit 120 assigns the weight to the most frequently occurring token and node type, thereby designating the token and node type that are regarded as being important in the script to be analyzed.

Here, the script-learning unit 120 may use TF-IDF as the algorithm for measuring the similarity between token types, and may use any of various algorithms, such as cosine similarity, the Euclidean distance between two values, and the like, in order to measure the similarity between AST node types.

Referring to FIG. 7 and FIG. 8, the frequencies of the tokens appearing in normal and malicious scripts are illustrated. It can be seen that the token 'Mandatory' most frequently occurs in the normal script, but that the token 'length', rather than the token 'Mandatory', most frequently occurs in the malicious script.

Here, the script-learning unit 120 may assign the weight to the token type and tree node type that most frequently occur in each of the normal and malicious scripts.

Here, the script-learning unit 120 may generate learning data, assign the weight thereto, and measure the similarity between the scripts.

Here, the script-learning unit 120 may designate m tokens and m node types that most frequently occur in each of the normal and malicious scripts, and may group the token types and node types according to type depending on the functions thereof in the normal and malicious scripts.

Here, when a new variant of a script is input, the script-learning unit 120 may first check the m tokens and m node types that frequently occur therein before training a deep-learning model and checking the result, thereby determining whether the input script is normal or malicious and checking the type of script from which such features are frequently found.

Referring to FIG. 9, an example of measurement of the similarity between the scripts to be analyzed is illustrated.

As shown in FIG. 9, as the similarity between scripts is higher, the similarity value is closer to '1', and as the similarity therebetween is lower, the similarity value is closer to '0'.

The malicious script detection unit 130 may determine whether the script is a malicious script based on the result of ensemble-based malicious script detection performed for the script, which is acquired using an ensemble detection model generated from the two learning models.

Here, the malicious script detection unit 130 may group the features extracted as having the highest frequency according to the types of functions performed by the corresponding features in the normal script and the malicious script.

Here, the malicious script detection unit 130 sets the two weights based on the features extracted as having the highest frequency and applies the two weights to the two learning models, respectively, thereby generating the ensemble detection model.

Here, the malicious script detection unit 130 combines the script detection results acquired using the first learning model and the second learning model, thereby providing the final script detection result.

Here, the malicious script detection unit 130 additionally outputs the grouping result acquired through similarity measurement and comparison, thereby providing information about the type of script that most closely resembles the script to be analyzed.

Here, the malicious script detection unit 130 may apply the weight assigned to the token-type features and tree-node-type features to the first learning model and the second learning model in order to combine the detection results of the first and second learning models.

Here, the malicious script detection unit 130 may generally select the detection result of the model exhibiting a higher detection rate when multiple detection models are present. However, when a higher weight is assigned to the learning data of the model exhibiting the lower detection rate, the detection result may be changed.

TABLE 1

| classified case | 1st model detection result | 2nd model detection result | weight (×0.0~1.0) | ensemble detection result |
|---|---|---|---|---|
| malicious case1 | 10 | 10 | 1st model = 1, 2nd model = 0.1 | 10 × 1 + 10 × 0.1 = 11 |
| malicious case2 | 91 | 10 | 1st model = 1, 2nd model = 0.1 | 91 × 1 + 10 × 0.1 = 92 |
| malicious case3 | 10 | 91 | 1st model = 1, 2nd model = 0.1 | 10 × 1 + 91 × 0.1 = 19.1 |
| malicious case4 | 50 | 50 | 1st model = 1, 2nd model = 0.1 | 50 × 1 + 50 × 0.1 = 55 |
| malicious case5 | 91 | 91 | 1st model = 1, 2nd model = 0.1 | 91 × 1 + 91 × 0.1 = 100.1 |

Table 1 illustrates an example in which weights are applied in order to combine the detection result of the first learning model with that of the second learning model. The malicious case2 and malicious case3 in Table 1 have the same detection rates of 10% and 91% when only the detection results of the first and second learning models are considered. Accordingly, if no weights are applied thereto, a malicious detection rate of 91% may be finally exhibited as the ensemble detection result. However, when the weights assigned to the features are applied to the learning models, the ensemble detection results in case2 and in case3 are malicious detection rates of 92% and 19.1%, respectively, and there is a large difference therebetween.

Here, the malicious script detection result 130 may alternatively use an ensemble method using majority voting, a random forest and decision tree algorithm, or the like in order to generate an ensemble detection model from the first and second learning models.

Figure 10:
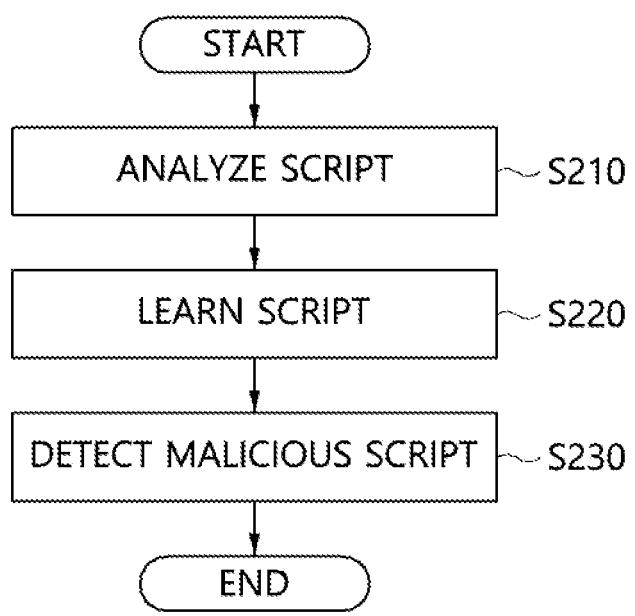
FIG. 10 is a flowchart illustrating a method for detecting a malicious script according to an embodiment of the present invention.
Figure 11:
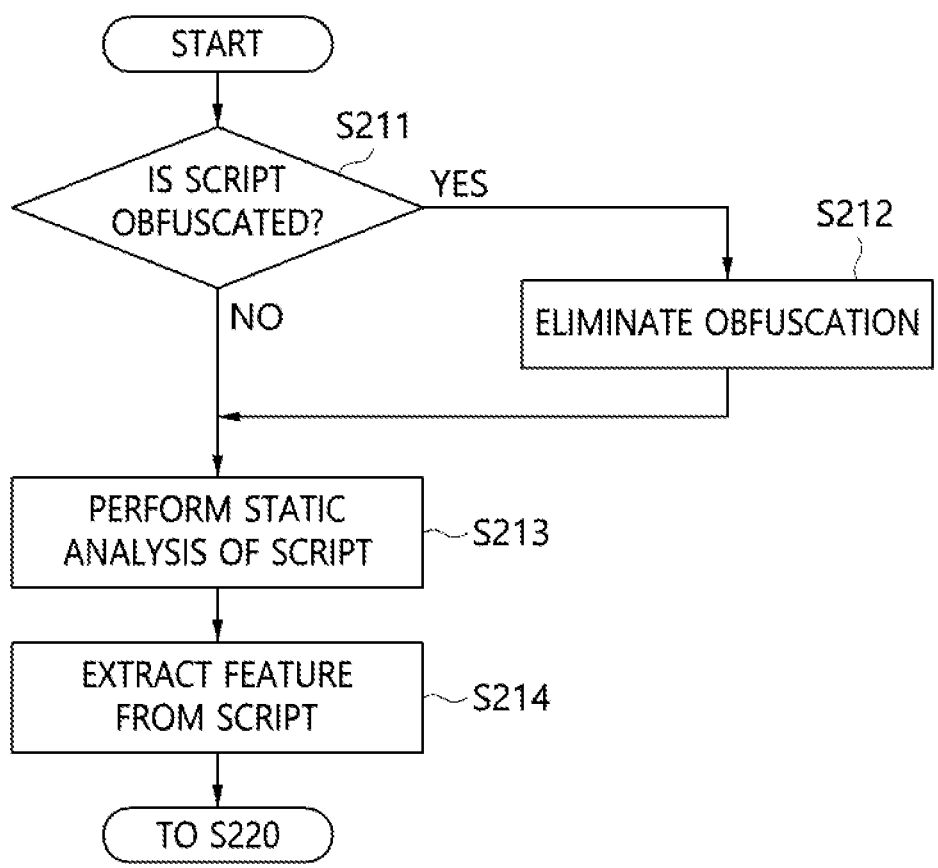
FIG. 11 is a flowchart specifically illustrating an example of the script analysis step illustrated in FIG. 10.
Figure 12:
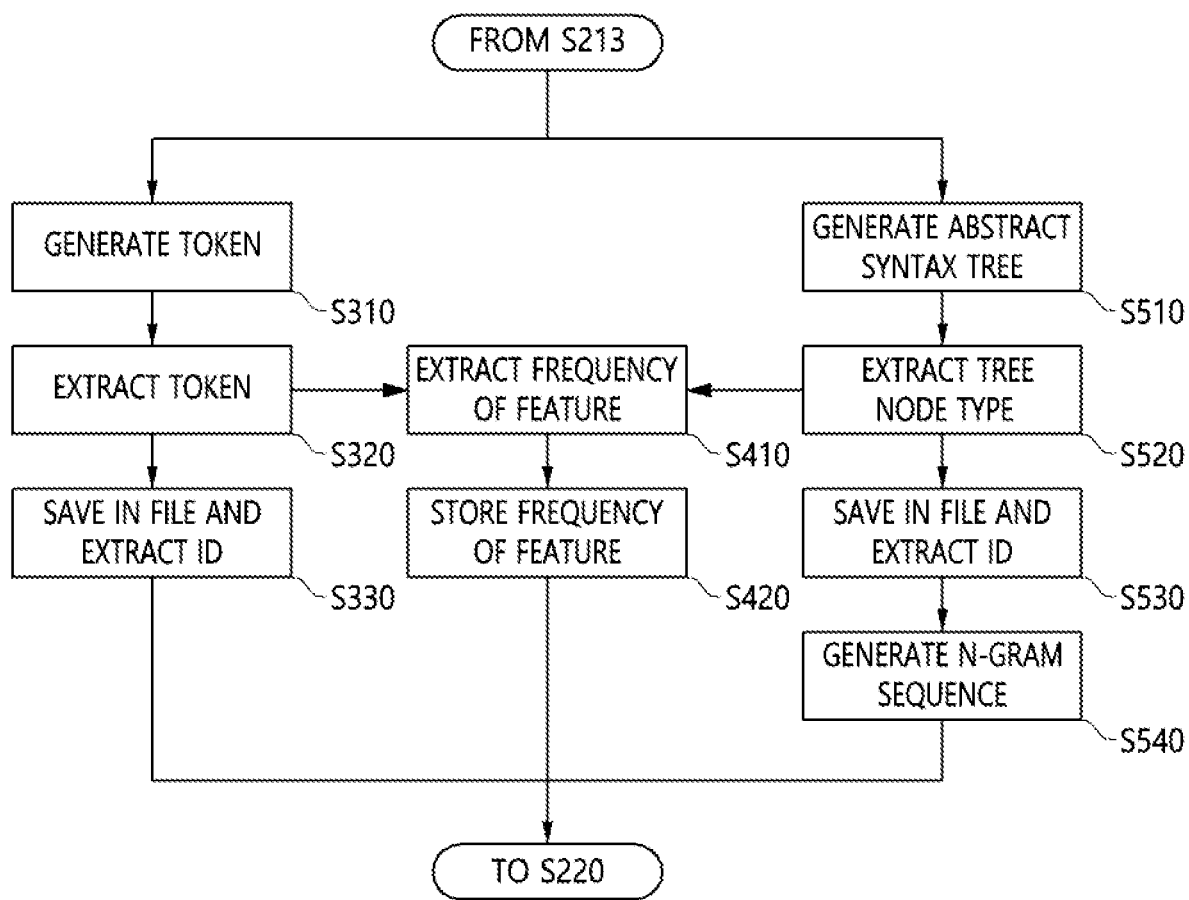
FIG. 12 is a flowchart specifically illustrating an example of the script feature extraction step illustrated in FIG. 11.

FIG. 10 is a flowchart illustrating a method for detecting a malicious script according to an embodiment of the present invention. FIG. 11 is a flowchart specifically illustrating an example of the script analysis step illustrated in FIG. 10. FIG. 12 is a flowchart specifically illustrating an example of the script feature extraction step illustrated in FIG. 11. FIG.

13 is a flowchart specifically illustrating an example of the script-learning step illustrated in FIG. 10.

Referring to FIG. 10, in the method for detecting a malicious script according to an embodiment of the present invention, first, a script may be analyzed at step S210.

That is, at step S210, token-type features, each of which corresponds to a lexical unit, and tree-node-type features of an abstract syntax tree (AST) may be extracted from an input script.

Referring to FIG. 11, at step S210, first, whether the script is obfuscated may be checked at step S211.

That is, at step S211, before the script is analyzed, whether the script is obfuscated may be checked.

Here, when it is determined at step S211 that the script is obfuscated, obfuscation may be eliminated at step S212, and static analysis of the script may be performed at step S213.

Also, at step S210, the features of the script may be extracted at step S214.

Referring to FIG. 12, at step S214, a token may be generated at step S310.

That is, at step S310, the script may be segmented into lexical units (tokens) using a tokenization method.

Here, all of the words included in the script may be regarded as tokens.

Also, at step S214, token-type features may be extracted at step S320.

That is, at step S320, a token-type feature that frequently occurs in the script and that contributes to distinguishing between a malicious script and a normal script may be extracted.

Referring to FIG. 2, tokens extracted from a script are illustrated.

Here, the token-type features may include at least one of a command type for representing a command included in the script, a parameter type used along with the command, an argument type used along with the command, a keyword type included in the script, and a variable type included in the script.

The command type is a type representing commands constituting the entire script, and may be used along with parameters and arguments.

The command parameter type may represent parameters used along with commands.

The command argument type may represent arguments used along with commands.

The keyword type may represent all keywords, and conditional statements may correspond thereto.

Here, when a token of a variable type appears after a token of a keyword type, a branch statement or the like may be additionally taken into consideration.

The variable type may represent all variables. Including all of the variables in the script may increase the cost of extraction and analysis of features, but may enable the flow of the script to be detected when the variable type is used along with the keyword type.

At step S320, the tokens (words) appearing in the script are sequentially arranged, and may then be used for training a first learning model.

Also, at step S214, the extracted token-type features may be saved in a file, and the ID thereof may be extracted at step S330.

That is, at step S330, all of the tokens may be converted to lower case, duplicate tokens may be removed therefrom, a number (hereinbelow referred to as ID_1) starting from 1 may be assigned thereto, and then the tokens may be saved in a text file.

Also, at step S214, the frequencies of the features may be extracted at step S410.

That is, at step S410, the frequencies of the token-type features included in the script may be extracted.

Also, at step S214, the frequencies of the features may be stored at step S420.

That is, at step S420, the frequencies of the token-type features may be stored in a database.

Also, at step S214, an abstract syntax tree may be generated at step S510.

That is, at step S510, an abstract syntax tree may be generated from the script to be analyzed.

Also, at step S214, tree node types may be extracted at step S520.

The abstract syntax tree may represent a script in units of blocks, and the node types of the AST may be used as features.

Also, at step S214, the extracted tree-node-type features may be saved in a file, and the IDs thereof may be extracted at step S530.

That is, at step S530, all of the extracted tree node types may be converted to lower case, duplicate tree node types may be removed therefrom, a number (ID_2) may be assigned thereto, and then the tree node types may be saved in the text file.

Here, the tree-node-type features may correspond to an N-GRAM sequence extracted from the abstract syntax tree using an N-GRAM algorithm.

Because the abstract syntax tree represents the script in units of blocks, the overall structure of the script may be detected when the sequence information is used therewith.

Also, at step S214, an N-GRAM sequence may be generated at step S540.

That is, at step S540, an N-GRAM sequence may be extracted by applying an N-GRAM algorithm to a document (document 1) in which tree node types appearing in each script are arranged, and a document (document 2) in which the N-GRAM sequence is listed may be generated.

Referring to FIG. 3, node types extracted from the abstract syntax tree of a script are illustrated.

Also, at step S410, the frequencies of the tree-node-type features may be extracted.

Here, at step S420, the frequencies of the tree-node-type features may be stored in the database.

Here, at step S420, the IDs of the token and tree node type that most frequently occur in the script may be stored along with the frequencies thereof.

Here, at step S420, the m most frequently occurring tokens, the m most frequently occurring tree node types, and the frequencies thereof may be extracted from the script and used as features for training learning models.

Here, at step S420, the m most frequently occurring tokens and m most frequently occurring tree node types may be continuously increased to a preset number of tokens and tree node types and used.

Here, at step S420, when the frequency value is greater than a preset value, the frequency value may be adjusted by applying a logarithm thereto.

Here, at step S420, the features corresponding to five token types may be extracted from the script, an AST may be generated from the script, tree node types may be extracted therefrom, and the extracted features and tree node types may be stored in the database.

Here, at step S420, the IDs of the m most frequently occurring tokens and m most frequently occurring tree node types, the frequencies of the m tokens and m tree node types, and the documents in which the IDs of all of the tokens and node types extracted from the script are arranged may be stored in the database.

Also, at step S214, the m extracted tokens, the m extracted node types, and frequency information pertaining thereto may be additionally stored in the database. Accordingly, when a new variant of a script is detected and classified, the detection and classification result may be inferred in advance merely by extracting tokens and node types from the script and checking the most frequently occurring features and the frequencies thereof before the detection result acquired by training a learning model is checked.

Here, at step S214, the frequencies of tokens and node types extracted respectively from a normal script and a malicious script are measured and compared, whereby the tokens and node types more frequently occurring in the malicious script may be identified.

Also, in the method for detecting a malicious script according to an embodiment of the present invention, the script is learned at step S220.

That is, at step S220, two learning models may be trained on two pieces of learning data generated in consideration of the features extracted respectively from the token-type features and the node-type features as having the highest frequency.

Figure 13:
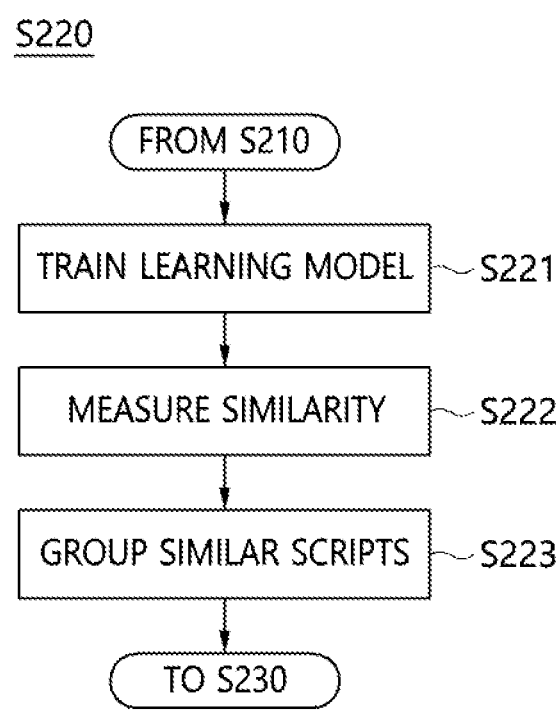
FIG. 13 is a flowchart specifically illustrating an example of the script-learning step illustrated in FIG. 10.

Referring to FIG. 13, at step S220, first, a learning model (deep-learning model) may be trained at step S221.

That is, at step S221, learning data for training the first learning model and the second learning model may be generated using the extracted features.

Here, at step S221, the document (text file), in which all of the extracted token types and tree node types are saved along with the IDs (ID_1 and ID_2) thereof after being converted to lower case and deduplicated, may be learned.

Here, at step S221, the order of appearance of a certain token type or tree node type in the script may be replaced with the ID saved in the text file and arranged.

Here, at step S221, the first learning model and the second learning model may be trained to learn the IDs of the m most frequently occurring tokens and m most frequently occurring tree node types, the frequencies of the m tokens and m tree node types, and the document in which the IDs of all of the tokens and node types extracted from the script are listed.

Here, at step S221, learning data may be generated using the IDs of the m most frequently occurring tokens and m most frequently occurring node types and the frequencies of the m node types.

Here, at step S221, 'ID_1 of the m most frequently occurring tokens, the frequencies thereof, and ID_1 of all of the tokens appearing in the script' may be generated as learning data for training the first learning model.

Here, at step S221, 'ID_2 of the m most frequently occurring node types, the frequencies thereof, and ID_2 of all of the node types appearing in the script' may be generated as learning data for training the second learning model.

Referring to FIG. 4, the structure of learning data according to an embodiment of the present invention is illustrated.

Learning data according to an embodiment of the present invention may include a file name, the ID of the feature having the highest frequency (top frequency feature ID), the highest frequency (frequency), the number of features, a value indicating a normal or malicious script (0 or 1), and the IDs of features.

When the number of most frequently occurring tokens and node types is set to 1 (m=1), the ID of the single most frequently occurring token, the ID of the single most frequently occurring node type, and the frequencies thereof are included in learning data, and m may be freely changed.

Referring to FIG. 5, the structure of learning data generated from token-type features according to an embodiment of the present invention is illustrated.

Referring to FIG. 6, the structure of learning data generated from tree-node-type features according to an embodiment of the present invention is illustrated.

Also, at step S220, the similarity between scripts may be measured, and weights for features may be set at step S222.

That is, at step S222, two weights may be set based on the similarity acquired by comparing the script with each of a previously stored normal script and a previously stored malicious script with respect to the token-type features and the tree-node-type features.

Here, at step S222, the weight may be assigned to the most frequently occurring token and node type, whereby the token and node type that are regarded as being important in the script to be analyzed may be designated.

Here, at step S222, TF-IDF may be used as the algorithm for measuring the similarity between token types, and any of various algorithms, such as cosine similarity, the Euclidean distance between two values, and the like, may be used in order to measure the similarity between AST node types.

Referring to FIG. 7 and FIG. 8, the frequencies of the tokens appearing in normal and malicious scripts are illustrated. It can be seen that the token 'Mandatory' most frequently occurs in the normal script, but that the token 'length', rather than the token 'Mandatory', most frequently occurs in the malicious script.

Here, at step S222, the weight may be assigned to the token type and tree node type that most frequently occur in each of the normal and malicious scripts.

Here, at step S222, the weight may be assigned to learning data after generation of the learning data, and the similarity between the scripts may be measured.

Also, at step S220, similar scripts may be grouped at step S223.

That is, at step S223, the m tokens and m node types that most frequently occur in each of the normal and malicious scripts may be designated, and the token types and node types may be grouped according to the types depending on the functions thereof in the normal and malicious scripts.

Here, at step S223, when a new variant of a script is input, m tokens and m node types that frequently occur therein may be checked first before training a deep-learning model and checking the result, whereby whether the script is normal or malicious may be determined and the type of script from which such features are frequently found may be further checked.

Referring to FIG. 9, an example of measurement of the similarity between the scripts to be analyzed is illustrated.

As shown in FIG. 9, as the similarity between scripts is higher, the similarity value is closer to '1', and as the similarity therebetween is lower, the similarity value is closer to '0'.

Also, in the method for detecting a malicious script according to an embodiment of the present invention, a malicious script may be detected at step S230.

That is, at step S230, whether the script is a malicious script may be determined based on the result of ensemble-based malicious script detection performed on the script, which is acquired using an ensemble detection model generated from the two learning models.

Here, at step S230, the features extracted as having the highest frequency may be grouped according to the types of functions performed by the corresponding features in the normal script and the malicious script.

Here, at step S230, the two weights may be set based on the features extracted as having the highest frequency, and the two weights may be applied to the two learning models, respectively, whereby the ensemble detection model may be generated.

Here, at step S230, the script detection results acquired using the first learning model and the second learning model may be combined, whereby the final script detection result may be provided.

Here, at step S230, the grouping result acquired through similarity measurement and comparison may also be output, whereby information about the type of script that most closely resembles the script to be analyzed may be provided.

Here, at step S230, the weight assigned to the token-type features and tree-node-type features may be applied to the first learning model and the second learning model in order to combine the detection results of the first and second learning models.

Here, at step S230, the detection result of the model exhibiting the higher detection rate may be generally selected when multiple detection models are present. However, when a higher weight is assigned to the learning data of the model exhibiting a lower detection rate, the detection result may be changed.

Table 1 illustrates an example in which weights are applied in order to combine the detection results of the first learning model and the second learning model. The malicious case2 and malicious case3 in Table 1 have the same detection rates of 10% and 91% when only the detection results of the first and second learning models are considered. Accordingly, if no weights are applied thereto, a malicious detection rate of 91% may be finally exhibited as the ensemble detection result. However, when the weights assigned to the features are applied to the learning models, the ensemble detection results in case2 and in case3 are malicious detection rates of 92% and 19.1%, respectively, and there is a large difference therebetween.

Here, at step S230, an ensemble method using majority voting, a random forest and decision tree algorithm, or the like may be alternatively used in order to generate an ensemble detection model from the first and second learning models.

Figure 14:
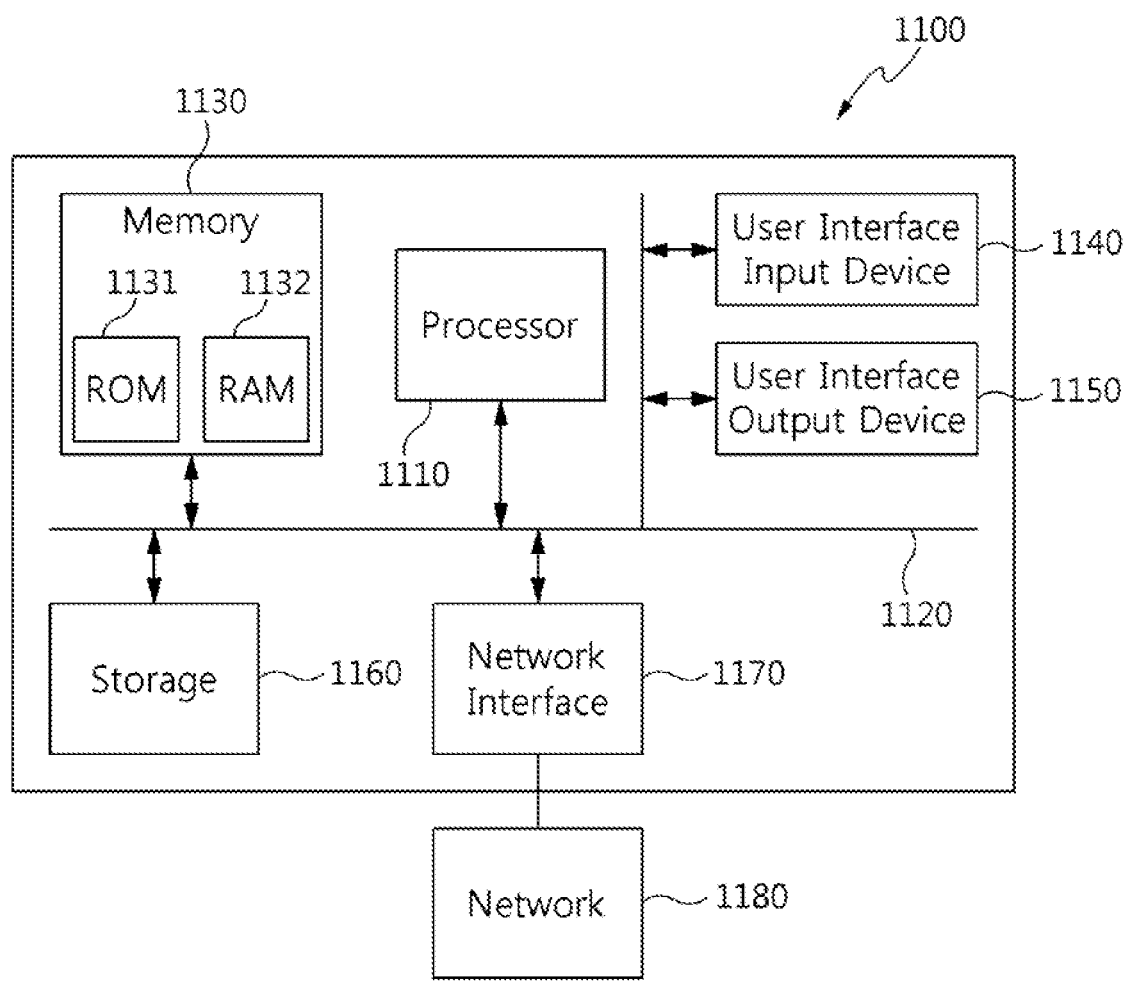
FIG. 14 is a view illustrating a computer system according to an embodiment of the present invention.

FIG. 14 is a view illustrating a computer system according to an embodiment of the present invention.

Referring to FIG. 14, the apparatus for detecting a malicious script according to an embodiment of the present invention may be implemented in a computer system 1100 including a computer-readable recording medium. As illustrated in FIG. 14, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The apparatus for detecting a malicious script according to an embodiment of the present invention includes one or more processors 1110 and executable memory 1130 for storing at least one program executed by the one or more processors 1110. The at least one program may extract token-type features, each of which corresponds to a lexical unit, and tree-node-type features of an abstract syntax tree (AST) from an input script, to train two learning models to respectively learn two pieces of learning data generated in consideration of features extracted respectively from the token-type features and the node-type features as having the highest frequency, and to detect whether the script is a malicious script based on the result of ensemble-based malicious script detection performed for the script, which is acquired using an ensemble detection model generated from the two learning models.

Here, the token-type features may include at least one of a command type for representing a command included in the script, a parameter type used along with the command, an argument type used along with the command, a keyword type included in the script, and a variable type included in the script.

Here, the tree-node-type features may correspond to an N-GRAM sequence extracted from the abstract syntax tree using an N-GRAM algorithm.

Here, the at least one program may set two weights based on the similarity acquired by comparing the script with each of a previously stored normal script and a previously stored malicious script with respect to the token-type features and the tree-node-type features.

Here, the at least one program may group the features extracted as having the highest frequency according to the types of functions performed thereby in the normal script and the malicious script.

Here, the at least one program may set the two weights based on the features extracted as having the highest frequency, and may generate the ensemble detection model by applying the two weights to the two learning models, respectively.

The present invention may more accurately detect a malicious script, thereby providing a more accurate detection result.

Also, the present invention may fast predict the result of detection of a new variant of a malicious script.

Also, the present invention may provide not only a detection result but also the results of detailed classification of scripts according to the types thereof.

As described above, the apparatus and method for detecting a malicious script according to the present invention are not limitedly applied to the configurations and operations of the above-described embodiments, but all or some of the embodiments may be selectively combined and configured, so the embodiments may be modified in various ways.

What is claimed is:

1. An apparatus for detecting a malicious script, comprising:
one or more processors; and
executable memory for storing at least one program executed by the one or more processors,
wherein the at least one program is configured to
extract token-type features, each of which corresponds to a lexical unit, and tree-node-type features of an abstract syntax tree from an input script,
train two learning models to respectively learn two pieces of learning data generated in consideration of features extracted respectively from the token-type features and the tree-node-type features as having a highest frequency, and
detect whether the script is a malicious script based on a result of ensemble-based malicious script detection performed for the script, which is acquired using an ensemble detection model generated from the two learning models.

2. The apparatus of claim 1, wherein the token-type features include at least one of a command type for a command included in the script, a parameter type used along with the command, an argument type used along with the command, a keyword type included in the script, and a variable type included in the script.

3. The apparatus of claim 2, wherein the tree-node-type features correspond to an N-GRAM sequence extracted from the abstract syntax tree using an N-GRAM algorithm.

4. The apparatus of claim 3, wherein the at least one program sets two weights based on a similarity acquired by comparing the script with each of a previously stored normal script and a previously stored malicious script with respect to the token-type features and the tree-node-type features.

5. The apparatus of claim 4, wherein the at least one program groups the features extracted as having the highest frequency according to types of functions performed by the features extracted as having the highest frequency in the normal script and the malicious script.

6. The apparatus of claim 5, wherein the at least one program sets the two weighs based on the features extracted as having the highest frequency and generates the ensemble detection model by applying the two weights to the two learning models, respectively.

7. A method for detecting a malicious script, performed by a malicious script detection apparatus, comprising:
    extracting token-type features, each of which corresponds to a lexical unit, and tree-node-type features of an abstract syntax tree from an input script,
    training two learning models to respectively learn two pieces of learning data generated in consideration of features extracted respectively from the token-type features and the tree-node-type features as having a highest frequency, and
    detecting whether the script is a malicious script based on a result of ensemble-based malicious script detection performed for the script, which is acquired using an ensemble detection model generated from the two learning models.

8. The method of claim 7, wherein the token-type features include at least one of a command type for a command included in the script, a parameter type used along with the command, an argument type used along with the command, a keyword type included in the script, and a variable type included in the script.

9. The method of claim 8, wherein the tree-node-type features correspond to an N-GRAM sequence extracted from the abstract syntax tree using an N-GRAM algorithm.

10. The method of claim 9, wherein training the two learning models is configured to set two weights based on a similarity acquired by comparing the script with each of a previously stored normal script and a previously stored malicious script with respect to the token-type features and the tree-node-type features.

11. The method of claim 10, wherein detecting whether the script is a malicious script is configured to group the features extracted as having the highest frequency according to types of functions performed by the features extracted as having the highest frequency in the normal script and the malicious script.

12. The method of claim 11, wherein detecting whether the script is a malicious script is configured to set the two weighs based on the features extracted as having the highest frequency and to generate the ensemble detection model by applying the two weights to the two learning models, respectively.

* * * * *